US007890849B2

(12) United States Patent
Moraveji et al.

(10) Patent No.: US 7,890,849 B2
(45) Date of Patent: Feb. 15, 2011

(54) CONCURRENT PRESENTATION OF MEDIA AND RELATED CONTENT LISTS

(75) Inventors: Neema Moraveji, Beijing (CN); Kishan Thambiratnam, Beijing (CN); Jun Liu, Saskatoon (CA); Roger Yu, Beijing (CN); Frank Seide, Beijing (CN)

(73) Assignee: Microsoft Corporation, Redmond, WA (US)

(*) Notice: Subject to any disclaimer, the term of this patent is extended or adjusted under 35 U.S.C. 154(b) by 911 days.

(21) Appl. No.: 11/532,384

(22) Filed: Sep. 15, 2006

(65) Prior Publication Data

US 2008/0072132 A1 Mar. 20, 2008

(51) Int. Cl.
*G06F 17/00* (2006.01)
*G06F 3/00* (2006.01)

(52) U.S. Cl. .................... 715/203; 715/255; 725/37
(58) Field of Classification Search ............. 715/201, 715/203, 255; 725/37, 40, 44, 47, 49; 348/564, 348/E5.105
See application file for complete search history.

(56) References Cited

U.S. PATENT DOCUMENTS

| 5,596,705 | A | 1/1997 | Reimer |
| 5,900,905 | A | 5/1999 | Shoff |
| 6,025,837 | A | 2/2000 | Matthews, III |
| 6,275,989 | B1 | 8/2001 | Broadwin |
| 6,505,348 | B1 * | 1/2003 | Knowles et al. ............ 725/49 |
| 6,880,171 | B1 | 4/2005 | Ahmad et al. |
| 2002/0010928 | A1 * | 1/2002 | Sahota .................... 725/40 |
| 2002/0059117 | A1 | 5/2002 | Yoch |
| 2003/0009377 | A1 * | 1/2003 | Asami et al. ............... 705/14 |
| 2003/0051252 | A1 | 3/2003 | Miyaoku |
| 2004/0068750 | A1 * | 4/2004 | Maa ...................... 725/113 |
| 2004/0162757 | A1 * | 8/2004 | Pisaris-Henderson et al. . 705/14 |
| 2004/0163101 | A1 * | 8/2004 | Swix et al. ................ 725/9 |
| 2004/0226042 | A1 | 11/2004 | Ellis |
| 2005/0021609 | A1 * | 1/2005 | Houghton et al. .......... 709/203 |

FOREIGN PATENT DOCUMENTS

| WO | WO0008855 | 2/2000 |
| WO | WO0106770 | 1/2001 |
| WO | WO2004053732 | 6/2004 |

OTHER PUBLICATIONS

Hemingway, D., Online video takes the next step, Dec. 5, 2005, available from http://www.imediaconnection.com/content/7354.asp.
PRNewswire, Interactive Television Networks, Inc. announces deal with Union(TM), the nation's premiere action sports destination, May 16, 2006, available at http://news.moneycentral.msn.com/ticker/article.asp?Feed=PR&Date=20060516&ID=5724105&Symbol=US:ZQK.
Creating value from IPTV, available at http://www.sun.com/solutions/documents/white-papers/te_iptv.pdf?facet=-1, Dec. 14, 2005.

* cited by examiner

*Primary Examiner*—Laurie Ries
(74) *Attorney, Agent, or Firm*—Lyon & Harr, LLP; Richard T. Lyon (57) ABSTRACT

The concurrent presentation technique provides information about content related to a source media currently being presented to a user in a fashion that allows the user to keep viewing the source media while either interactively or non-interactively perusing a list of related content. Thus, the user can see a list of related content without interrupting the presentation experience, and if desired, the user can choose to interact with the list to obtain further information about available related content.

20 Claims, 7 Drawing Sheets

CONCURRENT PRESENTATION OF MEDIA AND RELATED CONTENT LISTS

BACKGROUND

The Internet, and to a smaller extent private intranets, contain a large amount of interesting and useful multimedia content. This includes web pages, documents, images, separate audio and video, and audio-video combinations (A/V), among other things. For example, in the case of A/V, a user could find non-commercial news broadcasts and sports reports, podcasts covering a range of topics, amateur videos, and interesting home videos of people from around the world.

Arguably, various existing search engines can be used to find multimedia content on a network. However, there is a large amount of content that a user may find useful or interesting, but that they simply may never think to search for, or are too busy to search for, or simply just don't know how to find. For example, there may be multimedia content available that is related to an item currently being presented to a user. The user will be paying attention to the presented media, and may not even think to look for related content.

Thus, a problem exists on how to make a network user aware of other, related multimedia content.

SUMMARY

The present concurrent presentation technique provides information about content related to a source media presentation that is currently being provided to a user. The related content information is provided in a fashion that allows the user to keep viewing the source media. Generally, this is accomplished by providing a source media presentation to the user along with a listing of available content items related to the source media. To this end, the present technique involves receiving the source media presentation and presenting it to the user. In addition, content items that are related to the source media are identified. A listing of the identified related content items is then automatically presented to the user in a manner that in a passive presentation mode does not interrupt or obstruct the source media presentation.

The user can either interactively or non-interactively peruse a list of related content. Thus, the user can see a list of related content without interrupting the presentation experience, and if desired, the user can choose to interact with the list to view a particular related item or interactively peruse the set of available related items. Generally, the interaction takes the form of allowing the user to navigate through the related content item listings.

Further, in one embodiment of the technique, the user can queue related content items of interest in a separate list for later review, and can navigate the list of queued items to view or obtain more information about an item.

It is noted that while the foregoing limitations in existing schemes with regard to making a user aware of other, related multimedia content described in the Background section can be resolved by a particular implementation of a concurrent presentation technique according to the present invention, this is in no way limited to implementations that just solve any or all of the noted disadvantages. Rather, the present technique has a much wider application as will become evident from the descriptions to follow.

It should also be noted that this Summary is provided to introduce a selection of concepts, in a simplified form, that are further described below in the Detailed Description. This Summary is not intended to identify key features or essential features of the claimed subject matter, nor is it intended to be used as an aid in determining the scope of the claimed subject matter. In addition to the just described benefits, other advantages of the present invention will become apparent from the detailed description which follows hereinafter when taken in conjunction with the drawing figures which accompany it.

DESCRIPTION OF THE DRAWINGS

The specific features, aspects, and advantages of the present invention will become better understood with regard to the following description, appended claims, and accompanying drawings where:

DETAILED DESCRIPTION

In the following description of embodiments of the present invention reference is made to the accompanying drawings which form a part hereof, and in which are shown, by way of illustration, specific embodiments in which the invention may be practiced. It is understood that other embodiments may be utilized and structural changes may be made without departing from the scope of the present invention.

1.0 The Computing Environment

Before providing a description of embodiments of the present concurrent media and related content lists presentation technique (hereinafter simply referred to as the concurrent presentation technique), a brief, general description of suitable computing environments in which portions thereof may be implemented will be described.

The present concurrent presentation technique operates on a computing device that is capable of presenting multimedia content to a user. In this regard, the present technique is operational with numerous general purpose or special purpose computing system environments or configurations. Examples of well known computing systems, environments, and/or configurations that may be suitable include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

Figure 1:
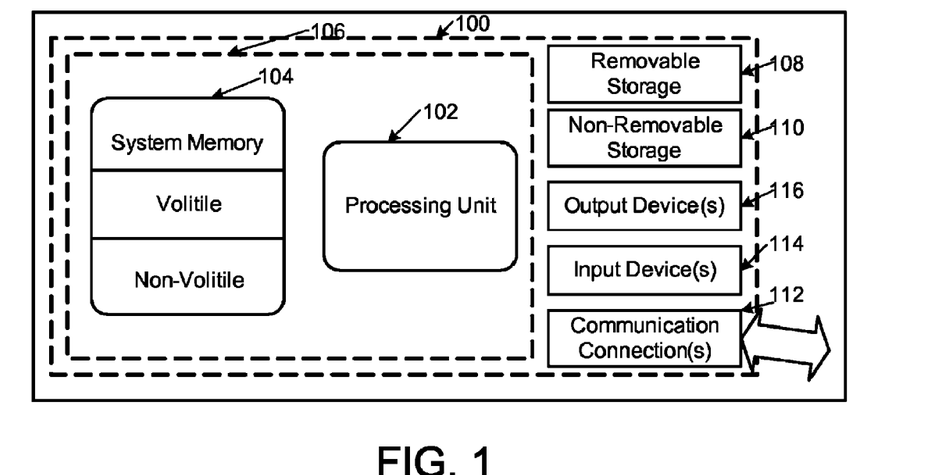
FIG. 1 is a diagram depicting a general purpose computing device constituting an exemplary system for implementing various embodiments of the present invention.

FIG. 1 illustrates an example of a suitable computing system environment. The computing system environment is only one example of a suitable computing environment and is not intended to suggest any limitation as to the scope of use or functionality of the present concurrent presentation technique. Neither should the computing environment be interpreted as having any dependency or requirement relating to any one or combination of components illustrated in the exemplary operating environment. With reference to FIG. 1, an exemplary system for implementing the present concurrent presentation technique includes a computing device, such as computing device 100. In its most basic configuration, computing device 100 typically includes at least one processing unit 102 and memory 104. Depending on the exact configuration and type of computing device, memory 104 may be volatile (such as RAM), non-volatile (such as ROM, flash memory, etc.) or some combination of the two. This most basic configuration is illustrated in FIG. 1 by dashed line 106. Additionally, device 100 may also have additional features/functionality. For example, device 100 may also include additional storage (removable and/or non-removable) including, but not limited to, magnetic or optical disks or tape. Such additional storage is illustrated in FIG. 1 by removable storage 108 and non-removable storage 110. Computer storage media includes volatile and nonvolatile, removable and non-removable media implemented in any method or technology for storage of information such as computer readable instructions, data structures, program modules or other data. Memory 104, removable storage 108 and non-removable storage 110 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by device 100. Any such computer storage media may be part of device 100.

Device 100 may also contain communications connection(s) 112 that allow the device to communicate with other devices. Communications connection(s) 112 is an example of communication media. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media.

Device 100 may also have input device(s) 114 such as keyboard, mouse, pen, voice input device, touch input device, camera, etc. Output device(s) 116 such as a display, speakers, printer, etc. may also be included. All these devices are well know in the art and need not be discussed at length here.

The present concurrent presentation technique may be described in the general context of computer-executable instructions, such as program modules, being executed by a computing device. Generally, program modules include routines, programs, objects, components, data structures, etc. that perform particular tasks or implement particular abstract data types. The present concurrent presentation technique may also be practiced in distributed computing environments where tasks are performed by remote processing devices that are linked through a communications network. In a distributed computing environment, program modules may be located in both local and remote computer storage media including memory storage devices.

The exemplary operating environment having now been discussed, the remaining parts of this description section will be devoted to a description of the program modules embodying the present concurrent presentation technique and implementations thereof.

2.0 Concurrent Presentation Technique

The concurrent presentation technique provides content related to source media currently being presented to a user via a network-connected computing device in a fashion that allows the user to keep viewing the media while either interactively or non-interactively perusing a list of related content. Thus, the user can see a list of related content without interrupting the presentation experience, and if desired, the user can choose to interact with the list to obtain further information about available related content. In one embodiment of the technique, the user can queue related content items of interest in a separate list. The user can then navigate the list of queued items to view or listen to a related content item. The following sections describe each of the foregoing features in more detail.

2.1 Passive Presentation Mode

Figure 2:
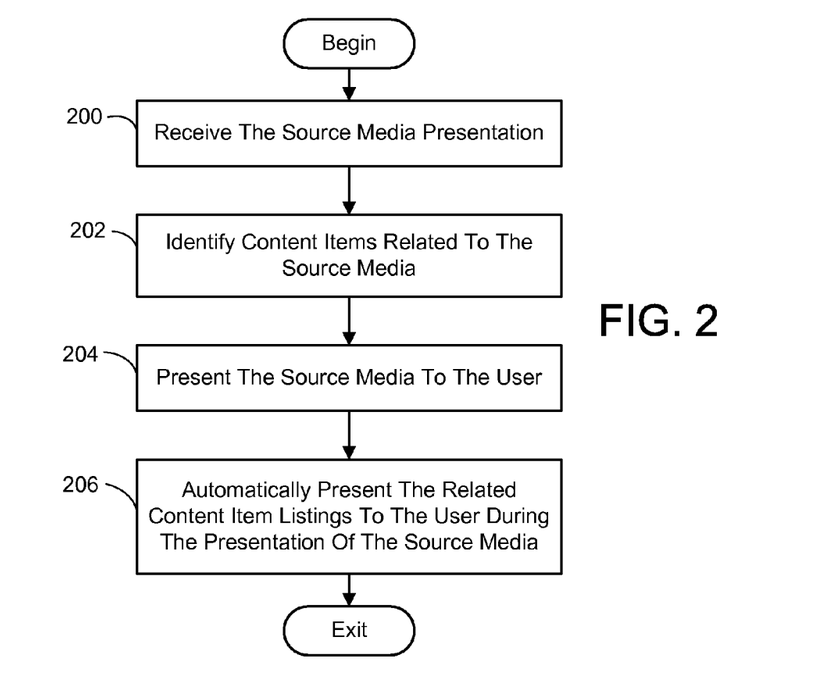
FIG. 2 is a flow diagram generally outlining one embodiment of a technique for concurrently providing a source media presentation to a user along with a listing of available content items related to the source media.

As indicated above, the concurrent presentation technique provides a source media presentation to a user along with a listing of available content items related to source media. Referring to FIG. 2, this generally involves the user's computing device receiving the source media presentation (200) and identifying content items that are related to the source media (202). The source media is then presented to the user (204). At the same time, a listing of the identified related content items is automatically presented to the user (206) in a manner that does not interrupt or obstruct the source media presentation. In this way, a user is given the functionality of a "query/result" search without the need to actually query for it.

The user can completely ignore the listing of related content items, or non-interactively peruse the list. This is because in a first mode, referred to herein as the passive presentation mode, the related content items are displayed so that the user can peruse them if desired, without the need for any user interaction whatsoever.

The types of source media that can be presented include web pages, documents, images, separate audio or video, and audio-video combinations (A/V), among other things. With the exception of an audio only presentation, the other source media types typically include a visual display. However, even audio can have a static or dynamic visual display that is shown to the user during the audio playback. Thus, the user will typically be viewing the source media on a display of some type. In the case of a webpage, it can be shown within a displayed browser.

One way to concurrently present a list of available related content is to display it below the source media. This placement has many advantages. For example, as it is below the display of the source media, it does not interfere or obscure any part of the media presentation. In addition, this placement does not significantly distract the user from the source media when the user wants to concentrate on the source media only. Still further, if the user is interested in related content, he or she can easily look down below the source media display for a moment to see a listed related content item, without missing any significant part of the source media presentation.

To further the non-obtrusive nature of the related contents list display, in one embodiment of the present technique only a single item is shown at any one time. If the source media currently displayed has more than one related content item associated with it, each item is displayed for a prescribed time and then replaced with the next item. In tested embodiments, the prescribed display time for each item was about 6 seconds. It is believed that the display of more than a single related content item at any one time may tend to distract the user from the source media presentation. In one version of this related contents list, the next item scrolls into place. In other versions, the current item could fade out and the next item could fade in. The change in items can be designed to call the users attention to it. For example, the scrolling motion may call the users' attention for a moment to the display of a new item. Animating the changing items is another way to call the user attention to the new item. Conversely, the change in items can be designed to not distract the user. The aforementioned fading technique is an example of a non-distracting item change.

Further, if the source media is of a type that has more than one part and these parts have different related content items associated with them, then when one part of the source media presentation transitions to another, the list of related content also changes so as to display the related content item list associated with the new part of the source media. Still further, if the parts of a source media are time-based (e.g., an audio, video or A/V presentation), the list of related content items associated with the current part of the source media is displayed for as long as the part is being played. In one embodiment that employs the aforementioned scrolling technique to change items, the transition involves an automatic horizontal scrolling of one the related content list entries associated with the new part of the source media into view. If more than one related content item is associated with the new source media part, then they are vertically scrolled into view as described previously.

Figure 3:
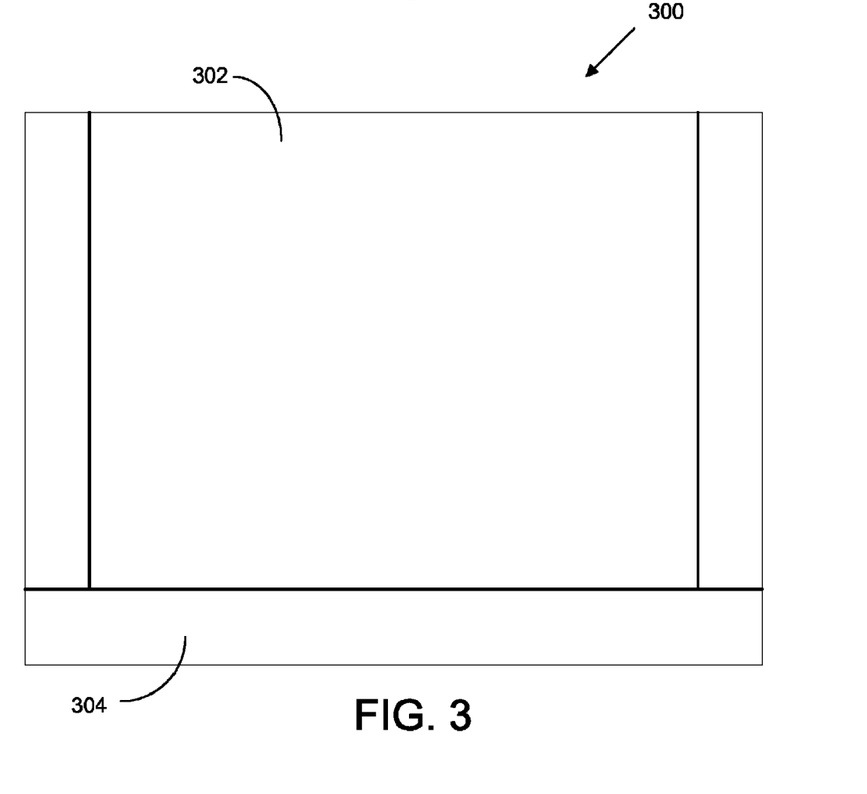
FIG. 3 is a wire-diagram illustrating one example of a graphical user interface layout that can be used to implement the present concurrent presentation technique.

FIG. 3 depicts a wire-diagram representing an example of a graphical user interface layout 300 that can be used to implement the passive presentation mode of the present concurrent presentation technique. The layout 300 includes a source media viewing sector 302 where the source media is "played". This can entail playing a video, or displaying an image, document or web page. In addition, if the video has an audio track, the audio would be played at the same time using the audio playback capability of the user's computing device. If the source media is primarily an audio presentation, it would be played via the audio playback feature. In this latter case, the viewing sector 302 would be blank, or as indicated previously could show a prescribed static or dynamic visual display. The layout 300 also includes a related content sector 304, where in the passive presentation mode, a list of related content items is displayed to the user without occluding the source media.

2.1.1 Related Content Items

In regard to the related content items, the present concurrent presentation technique does not restrict the type in any way. For example, related content can include web pages, document files, image files, separate audio or video files, and audio-video combinations (A/V), among other things. In general, a related content item listing can include a representative thumbnail, the title of the content item, the source of content, the duration or length of the content (if it is a time-based media item), or any combination of these.

As stated previously, the listed content items are chosen because they relate in some way to the currently displayed source media. The types of relationships can be as broad or narrow as desired. For example, relationship types can include, but are not limited to:

Topic—items are related by the same subject matter, or semantic concept;
Genre—e.g. action, romance, drama, documentary;
Mood—e.g. happy, sad, scary, childish;
Image theme—e.g. forest, jungle, people, animals;
Speaker—e.g. President of the United States;
Geographical location—e.g. Australian, Asian; and
Author—e.g. a new network, a particular commentator.

Further, relationships can be established at a variety of scopes. For example, a short-term, local scope could be employed where the relationship is based on the currently displayed source media. A longer-term, local scope could also be employed when the currently displayed source media is part of a larger piece. In this latter case the relationship is based on the current segment, chapter, or the like, of the overall source media containing the currently displayed portion. The relationship can also be based on the entire source media in a global scope. Still further, the relationship basis can be expanded outside the currently displayed source media. For example, the relationship can be based both the current and past source media presentations to the user. If information about a user's social network is known, the relationship could even be based not only on the current presentation, but also source media presentations viewed by others is the network. The relationships need not be limited to a single source media scope either. For example, the related content list can be constructed using both short-term and long-term local scopes. Further, for a given scope of the source media, the relationships can be established between the same scope of the related content or between a different scope of the related content.

Relationships between the currently displayed source media and the listed related items can be determined in a number of ways. For example, relationships can be established using methods, including, but not limited to, manual categorization, automatic speech recognition techniques, video signal processing techniques, dominant image processing techniques, and direct signal process, to name a few. In addition, depending on the method used to establish relationships, they can be determined on-the-fly, or retrieved from a central database, or extracted from a markup file that accompanies the source media. Further, the related content items can be sourced from publicly-available free Internet content, and/or obtained from private related content providers.

Given the foregoing it can be seen that the particular relationship scopes and the methods used to determine the relationships can be any desired. What matters is that related content is identified and associated with the source media.

2.1.2 In-Line Advertising

Another category of related content items that can be listed in the related contents list area involves targeted advertising, referred to herein as "in-line advertising". More particularly, listed related content items can be advertisements for goods, services, events and so on, which can have relevance to the source media currently being viewed (and/or heard) by a user. Thus, advertising can be delivered in a fashion that is relatively non-obtrusive.

In one embodiment, still-image advertising (such as exposure/banner style advertising) is shown to the user in the related content sector in the same scrolling manner as described previously with regard to other related content items. In this way, the user can potentially be exposed to multiple advertisements during the same part of a source media. It is also noted that the related content items can be exclusively advertising, or a mixture of advertising and other types of related content items.

In addition to viewing the advertising items listed in the related content sector, the user can interact with the list. For example, the user may choose to scroll through the list of advertisements and can queue one or more of them, just as any other related content item listed in the related content sector. Further, the user can navigate and display whatever media may be associated with a queued advertisement in the same manner as described for other types of queued related content items.

2.1.3 In-Line Shopping

Yet another category of related content items involves what will be referred to herein as "in-line shopping". More particularly, a listed related content item can refer to products or services that the user can purchase using the present technique. For example, if the user is watching a commercial on washing machines in the source media sector, the related content sector may show a picture of the washing machine, or the logo of an enterprise that sells the washing machine, or both. The price of the washing machine may also be included.

The user can then choose to queue a product or service listed in the related contents sector. Adding a product or service to the queue is akin to adding an item to a shopping cart in an on-line store. The user can then complete the purchase of the item by selecting to the product within the queue, which would link the user to a site where the item can be bought. Navigating the related contents listings, adding an item to the queue and navigating the queue itself in the context of in-line shopping are accomplished as described in connection with other types of related content. In addition, here again, the related content items can be exclusively in-line shopping items, or a mixture of these items and other types of related content.

2.2 Related Content Item List Interaction And Queue Creation

As stated earlier, the user can completely ignore the listing of related content items, or non-interactively peruse the list. However, in addition, the user can choose to interact with the list and add a listed item to a user-generated virtual queue. This can entail placing a currently displayed related content item in the queue, and/or it can involve navigating the related content lists to place other items in the queue.

Figure 4:
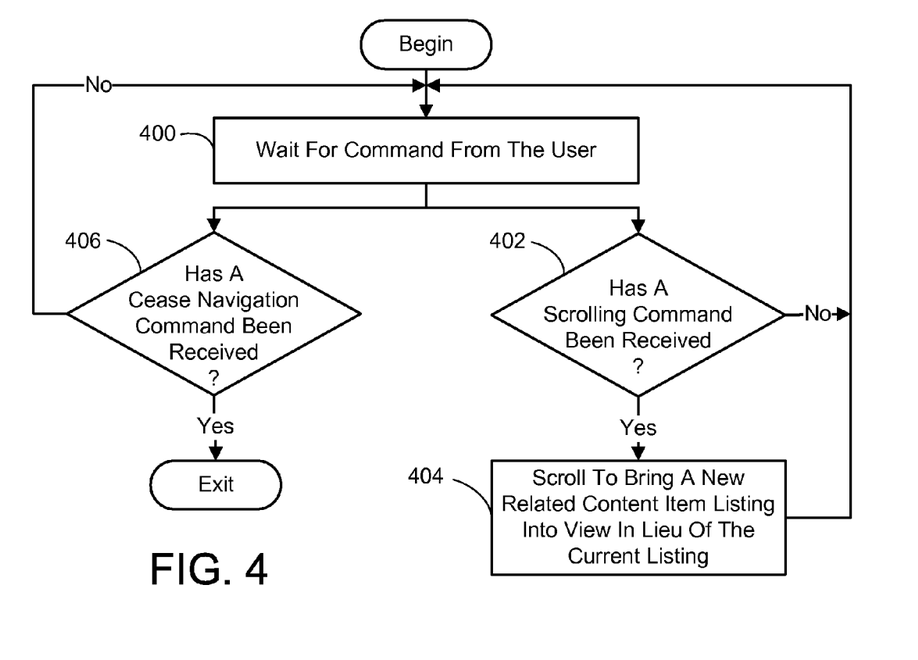
FIG. 4 is a flow diagram generally outlining one embodiment of a procedure for navigating the related content list.

Navigating the related content lists involves a manually scrolling operation. More particularly, referring to FIG. 4, this related content list navigation procedure involves waiting to receive a command from the user (400) and determining if an incoming command is a scrolling command (402). If not, the procedure involves continuing to wait for a command. If, however, the incoming command is a scrolling command, the procedure involves scrolling the currently displayed related content item listing out of view while scrolling another one of the related content item listings into view (404). This scrolling action is repeated for as long as scrolling commands are received, as can be seen in FIG. 4. However, as will be described shortly, the user will be able to return to the view that was being displayed in the source media sector before initiating the related content list navigation procedure and continue viewing the source media from that point (or listening in the case of an A/V or audio only source media). To this end, when a command is received from the user (400), it is also determined if the command is a cease navigation command (406). If not, the procedure continues by waiting for a command. If, however, the incoming command is a cease navigation command, the procedure ends and the concurrent presentation technique returns to the aforementioned passive presentation mode. In addition, while not shown in FIG. 4, the procedure can end and the technique return to the passive presentation mode if no command is received for a prescribed period of time.

In cases where the source media presentation is of a type that has more than one part and these parts have different related content items associated with them, the user can either scroll vertically in the list to sequentially view each related content item listing associated with the currently presented part of the source media, or can scroll horizontally to view a listing associated with another part of the presentation. If there is more than one related content item associated with the new part of the source media, then the user can once again scroll vertically to sequentially view each listing. The user can add any related content item to the queue by selecting it when it is displayed.

Figure 5A:
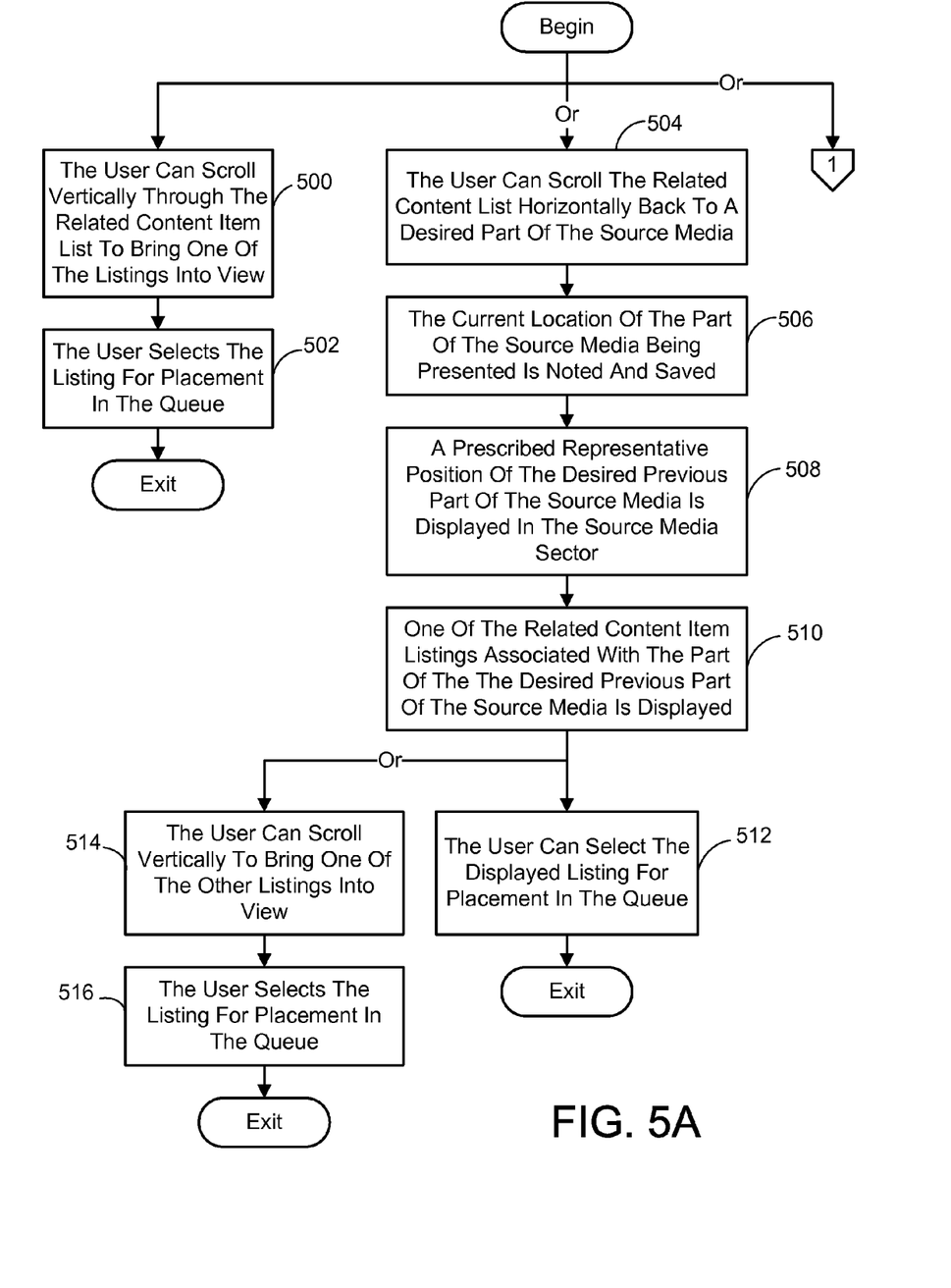
FIGS. 5A-B are a continuing flow diagram generally outlining one embodiment of a procedure for scrolling through the related content item listings associated with one or more parts of source media presentation and selecting listings for placement in a queue.
Figure 5B:
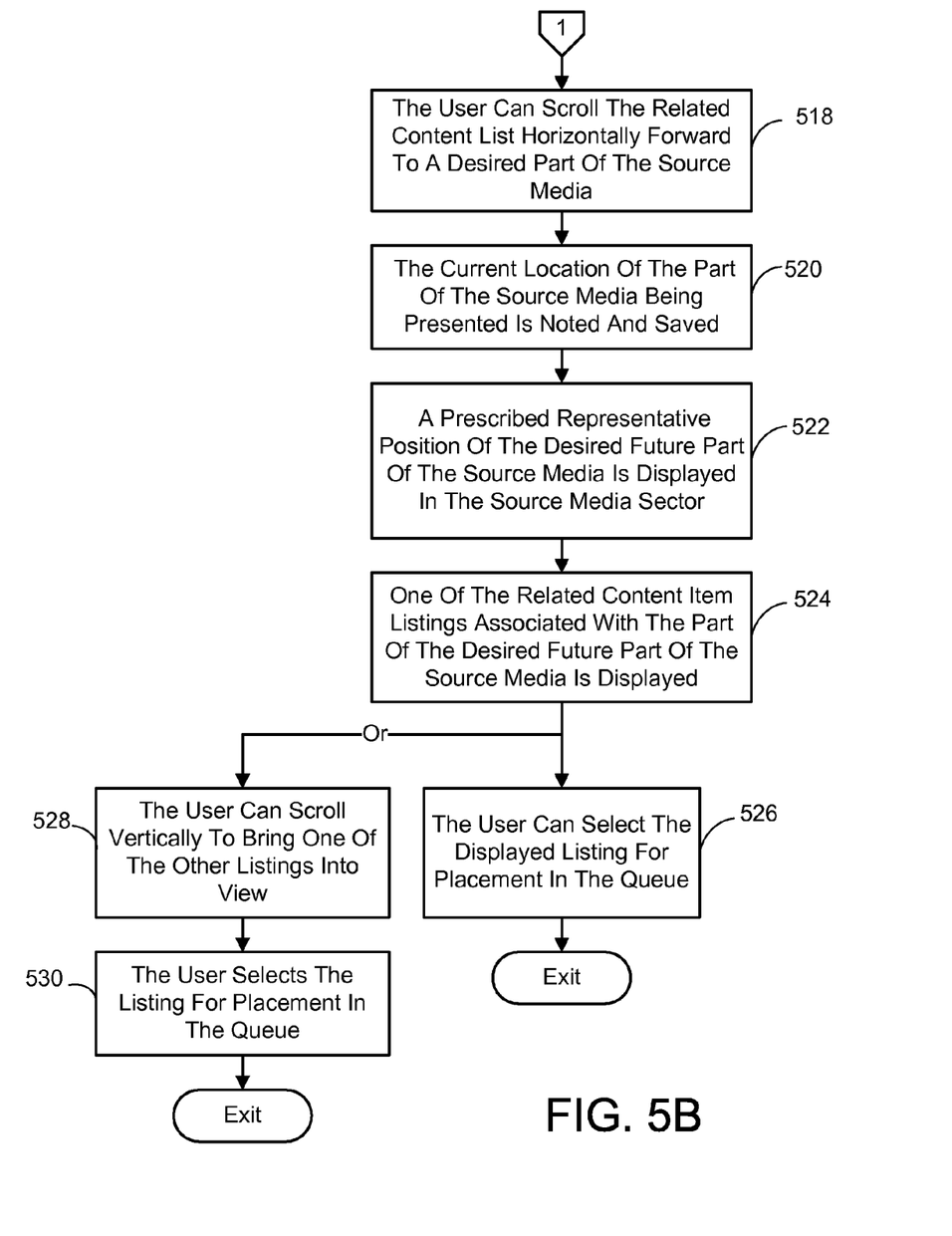

For example, referring to FIGS. 5A-B, to bring a related content item listing associated with the currently displayed part of the source media in to view, the user scrolls vertically through the list (500). The user can then select that listing for placement in the queue (502). Alternately, to bring related content item listings associated with a previously displayed part of the source media in to view (assuming there is one), the user manually scrolls the related content list horizontally back to the desired part of the source media (504). In one version of the present navigation procedure (exemplified in FIG. 5A), the current location of the part of the source media being presented, would be noted and saved (506), and a prescribed representative position (e.g., the last viewed position or the first position) of the previous part of the source media that the user scrolled to would be displayed in the source media sector instead (508). In addition, one of the related content item listings associated with the part of the source media now under consideration would be displayed (510). The user can then select that listing for placement in the queue (512), or scroll in the vertical direction to bring another listing in to view (514). The newly displayed listing can then be selected if desired (516). It is noted that the aforementioned current and representative positions of parts of the source media presentation will vary depending on the type of media being presented. For example, if the media is time-dependent, such as an audio, video, or A/V presentation, then the position refers to the a frame. If the media is not time-dependent, the current or representative position could refer to a particular page or view.

In cases where the source media is recorded in some fashion such that a part of it that has not yet been displayed can be accessed, the user can navigate through the related content item listings associated with these parts of the source media as well. Referring to FIG. 5B, to bring related content item listings associated with a yet-to-be displayed part of the source media in to view (assuming there is one), the user manually scrolls the related content list horizontally forward to the desired part of the source media (518). Here again, the current location of the part of the source media being presented, would be noted and saved (520), and a prescribed representative position of the yet-to be displayed part of the source media that the user scrolled to would be displayed (522). In addition, one of the related content item listings associated with the part of the source media now under consideration would be displayed (524), and the user can then select that listing for placement in the queue (526), or scroll vertically to bring another listing in to view (528). The newly displayed listing can then be selected if desired (530).

The aforementioned scrolling and selection actions can be accomplished in any conventional manner appropriate for a graphic user interface.

2.3 Queue Navigation

As described previously, the user can also choose to interact with the aforementioned queue to access a related content item listed within. The previously-described queue generation involved selecting a related content item listing in the related content sector. A queue navigation session can then be initiated to navigate the queue and cause related content items listed therein to be displayed in the source media sector (and/or played via the user's computing device audio playback elements if the queued item includes an audio component or is an audio-only selection).

Figure 6A:
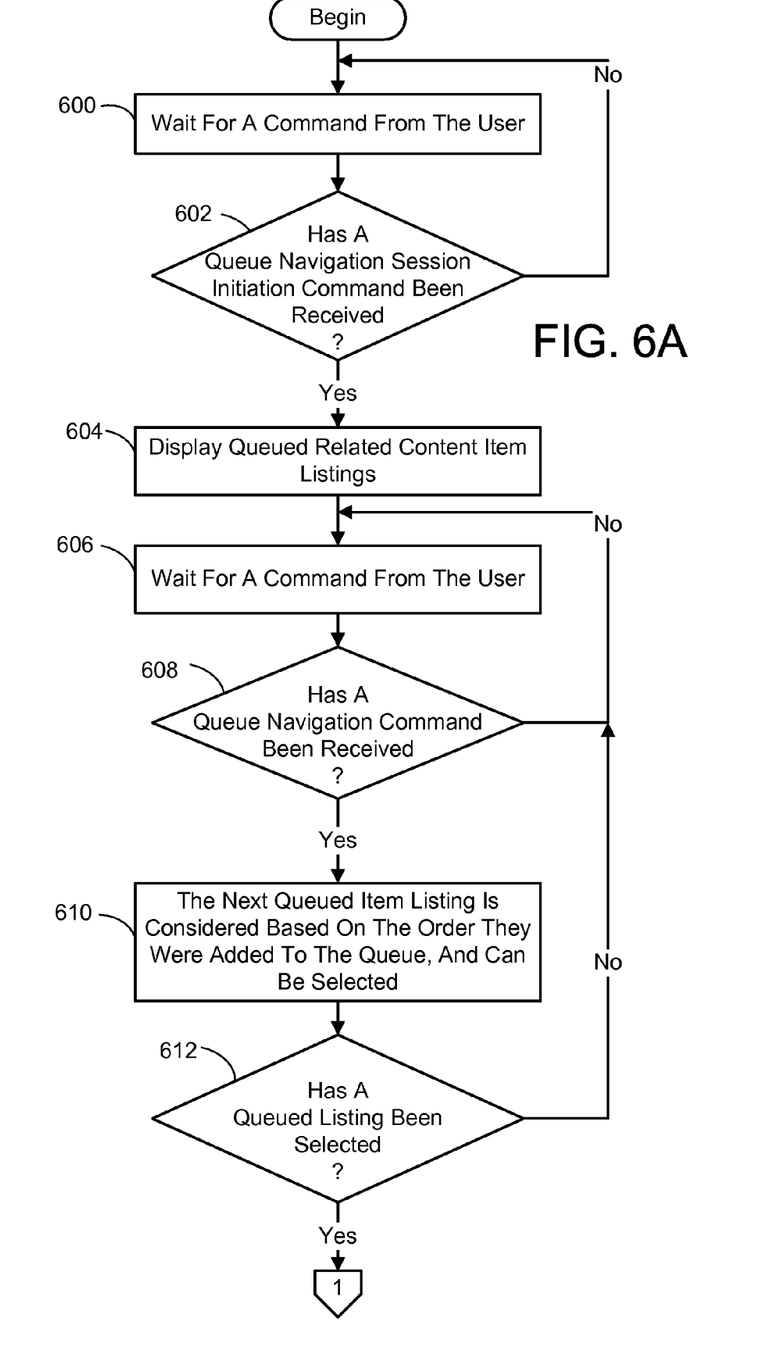
FIGS. 6A-B are a continuing flow diagram generally outlining one embodiment of a procedure for initiating a queue navigation session, navigating the queued related content items, and displaying the related content items associated with the queued listings.
Figure 6B:
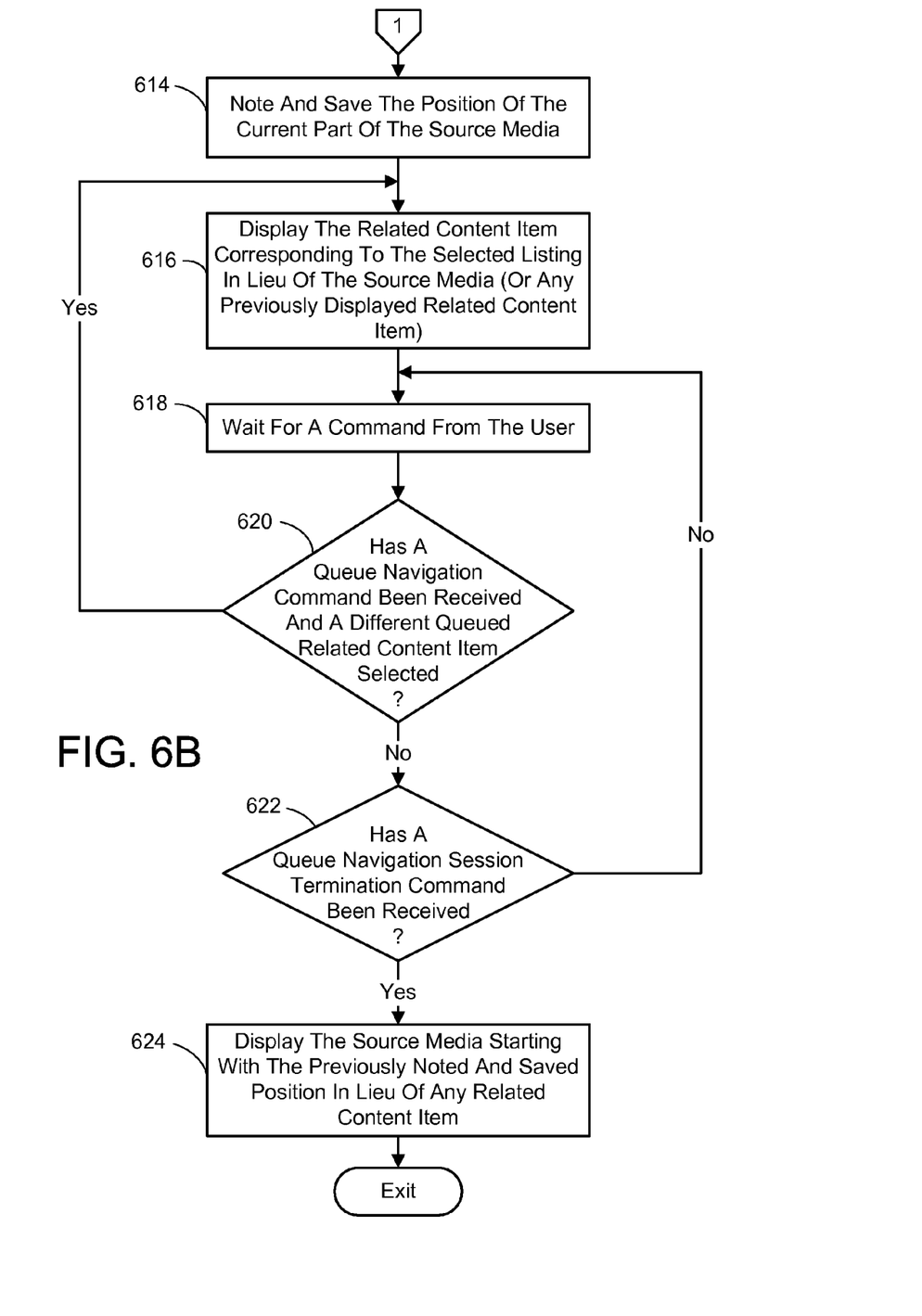

In general, referring to FIGS. 6A-B, one embodiment of this queue navigation, involves waiting to receive a command from the user (600) and determining if an incoming command is a queue navigation session initiation command (602). If not, the waiting continues. If, however, the incoming command is a queue navigation session initiation command, related content item listings that have been placed in the queue are displayed (604) in the aforementioned related contents sector. The queue navigation mode then involves waiting for a new command to be received from the user (606) and determining if a received command is a queue navigation command (608). If not, the waiting continues. However, if a received command is a queue navigation command, the next queued item listing is considered based on the order they were added to the queue, and can be selected (610). It is next determined if a queued listing has been selected (612). If not, actions 606 through 612 are repeated. However, if it is determined that a queue item has been selected, the position of the current part of the source media being presented is noted and saved (614). In addition, the related content item corresponding to the selected listing is displayed in the source media sector in lieu of the source media (616). In the case where the related content item is time-based such as a video or audio file, this entails playing the file. The file can be played from the beginning, or in one version if the file had been played before, it can be started from the last viewed or heard location if that location was noted and saved. In the case where the related content item is non-time dependent such as a web page, document or image, the item is simply displayed to the user.

The user can continue to navigate and view related content items from the queue, or can choose to enter a command to end the queue navigation session. Upon ending the queue navigation session, the source media that was displayed in the source media sector prior to initiation of the session would be displayed once again. In the case of a time-based media, it begins playing from the point it was at before the queue navigation session began based the previously noted and saved position. More particularly, referring to FIG. 6B once again, in one embodiment this involves first waiting to receive a command from the user (618). When a command is received, it is determined if it is a queue navigation command and a different queued item listing has been selected (620). If so, actions 616 and 618 are repeated, which in this case involves displaying the related content item corresponding to the newly selected listing in lieu of any previously displayed item. If, however, the received command is not a queue navigation command and no new item has been selected, then it is determined if the incoming command is a queue navigation session termination command (622). If not, the waiting continues. If, however, the incoming command is a queue navigation session termination command, the source media that was being presented at the time the queue navigation session was initiated is restored to the source media sector in lieu of any related content item, starting at its previously noted and saved position (624).

In one embodiment of the queue navigation mode, the particular queued related content item that is initially considered is the last item entered in the queue. In another embodiment, it is the first item entered in the queue. Either way, the user navigates through the queued items in these embodiments by scrolling forward or backward as the case may be from the initially displayed item, in the order the items were entered in the queue. As each item comes under consideration, it can be automatically displayed in the source media area in lieu of the last-displayed item as is the case in tested embodiments of the present queue navigation mode. Alternately, each queued item can be highlighted when it is reached in the scrolling. The user then selects the highlighted item if he or she wants it displayed in the source media sector. It is also possible to list the queued related content items and have the user directly select one from the list which would then be displayed in the source media sector. It is noted that the aforementioned scrolling, highlighting and selection actions can be accomplished in any conventional manner appropriate for a graphic user interface.

In regard to the queued related content item listings themselves, all or some are displayed to the user whenever the queue is accessed and the queue navigation session is initiated. If not all the queued items can be displayed at the same time owing to space limitations, the user can scroll through the listings to see the items not initially displayed. As for their appearance, a queued related content item listing can include, but is not limited to, a representative thumbnail, the title of the content item, the source of content, the duration or length of the content (if it is a time-based media item), or any combination of these.

3.0 Television-Based Model

The foregoing concurrent presentation technique is particularly useful in the context of television. In this domain, users are typically restricted to a predefined set of channels. However, the Internet contains a vast range of interesting videos, images and recorded audio shows that a user may find useful and entertaining. The concurrent presentation technique can be employed to allow a user to review and access Internet content related to the current show they are watching. In this way, the range of content available to the user is broadened from a limited set of typically commercial shows to a diverse set of media including professional news programs (both domestic and international), amateur TV stations, and publicly available home videos, to name a few. In addition, this flexibility can be provided without the need for a user to perform a search or query to retrieve a list of related content.

The typically passive activity of watching television has always favored the use of low-interaction user interfaces, such as a conventional television remote control and menu-based selection schemes. However, while past low-interaction user interfaces were simple to use, they tended to restrict interaction-intensive activities such as browsing related content. In particular, typical television remote controls are not well-suited to browsing. The present technique can be used to advantage to provide a user both a low-interaction interface and a seamless style of Internet browsing that even users with low technical skills will find easy.

Figure 7:
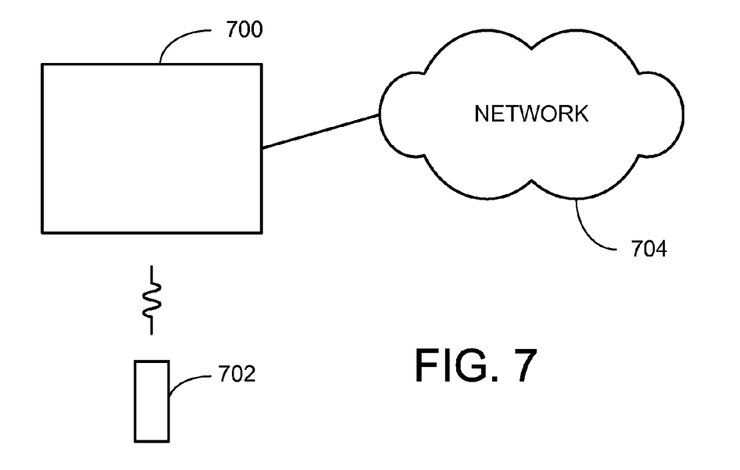
FIG. 7 is a block diagram illustrating one example of a system for implementing the present concurrent presentation technique in the context of a television-based model.

The following sub-sections describe embodiments that implement the present concurrent presentation technique in the context of a television-based model. An example of a system implementing this model is shown in FIG. 7. The example system includes a network-capable television (700)

and a television remote control (702). The television (700) is connected to a network (704), such as the Internet or a private intranet. In addition, the television can be an integrated unit as shown in FIG. 7, or a monitor with a separate network-connected computing device (not shown).

As indicated above, this implementation employs a conventional television remote control device as a user interface for interaction with a television on which a user is viewing an A/V source media (hereinafter referred to as the source video). It is noted that in the following description, specific buttons on the remote control are specified to perform certain functions. However, the specified buttons are examples only. Thus, any button or other element found on the remote can be prescribed instead to perform a particular function. Still further, while a television remote control is employed, other user interface devices compatible with the television equipment being utilized can be used instead to enter user commands.

3.1 Operation

The television-based model operates as follows. A bar at the bottom of the television screen is used to display a list of related content items. This bar acts as the related content sector described previously. Only a single content item is displayed in this bar at any given time to reduce distraction from the source video. The list of related content items that are sequentially displayed in the bar is periodically updated based on the current position in the source video (e.g., every second). If the list of related content items has not changed since the last update, and the content item currently displayed has been shown for more than a prescribed number of seconds (e.g., 6 seconds), then the next item in the related content list is scrolled vertically to take the place of the current item. Thus, as the user is watching a segment of the source video and not interacting with the related contents list, he or she will see content items from the current list scrolling vertically at prescribed intervals. However, if the list of related content items has changed since the last update, then an item in a new list of content items related to the current position in the source video is scrolled horizontally into the bar.

Users can interact with the related content listings by cycling through the current related content list manually. This navigation of the listings is accomplished by pressing the Up or Down button on a remote control to move to the previous/next item in the current related content list. Users can also skip back/forward to the previous/next point of change of the related content list by pressing the Left/Right button on the remote control. When this occurs, the current position of the source video is changed to correspond to the newly displayed related content listing, which is horizontally scrolled into the bar. It is noted that only pressing the Left/Right buttons (not Up/Down) will alter the position of the source video. It is also noted that before jumping to a different point in the source video, the currently displayed point in the video is noted and saved so that it can be returned to after the user is through with navigating the related content item listings. In addition, it is noted that the point in the video jumped to when the user skips back/forward to the previous/next point of change of the related content list, can be any prescribed point desired—such as the beginning of that part of the video.

3.2 Queue Creation and Navigation For A Television-Based Model

When the user sees a related content item listed in the bar that they would like to view in more detail, he or she can add the item to the aforementioned queue list for subsequent review. In the context of the present television-based model, the queue creation and navigation features operate as follows.

A user presses the 'Record' button on the television remove control to add the currently displayed related content item to the queue. The queue is populated as described previously. The net result of this queue creation technique is that the user progressively creates his or her own "related content TV channel" with very limited interaction.

When a user adds an item to the queue, any one of several possible things could occur. In one embodiment, as soon as a user adds an item to the queue, the queue is automatically accessed and a queue navigation session is initiated. In another embodiment, as soon as the user adds an item to the queue, it is automatically accessed, but only for a moment, at which point the bar reverts to displaying the current list of related content items. The purpose of this latter embodiment is to confirm to the user that the last selected item was added to the queue. In yet another embodiment, nothing happens. In other words, when the user adds an item to the queue, the related content items associated with the current portion of the source video continue to be listed in the bar and the source video continues to play. It is noted that, if an item in the queue is viewed, even for a moment, the point in the source video currently being played is noted and saved. Upon exit from the queue the source video is restarted from the saved point.

The queue can also be accessed manually at any time. To accomplish this, the user presses the "Guide" button on the remote control. This initiates a queue navigation session. Further, anytime the user wants to end an ongoing queue navigation session and exit the queue, he or she simply presses the "Guide" button on the remote control. Thus, this button provides both access and an exit from the queue.

Figure 8:
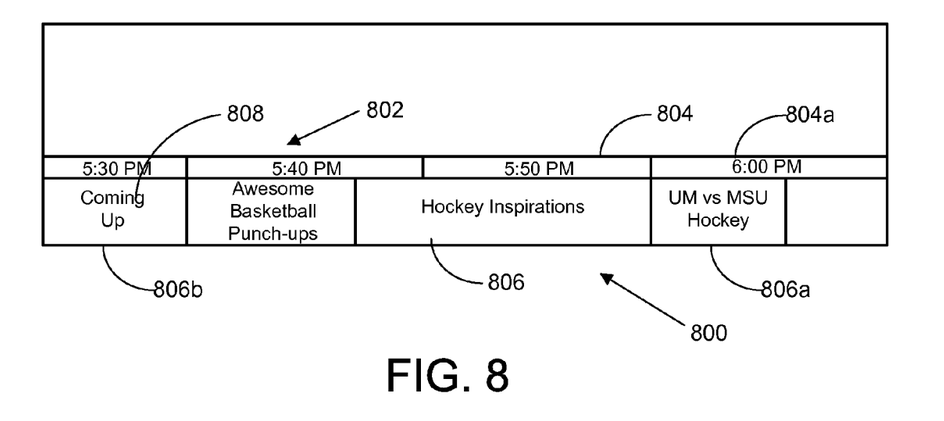
FIG. 8 is a diagram illustrating one example of a graphical user interface layout for a Related Content Guide that is displayed upon the initiation of a queue navigation session.

In one embodiment, initiation of a queue navigation session causes a Related Content Guide (RC Guide) to be displayed in the bar at the bottom of the television screen in lieu the related content listings. An example of what the RC Guide (800) might look like is shown in FIG. 8. The design of the RC Guide (800) is very similar to that of the traditional TV guide, except that it shows a horizontal line (802) of prescribed length time slots (804), starting from the time the user accesses it. For example, 10 minute slots as shown in FIG. 8. Time-based media items in the queue are represented as rectangular boxes (806) under the time slots, with a length along the line representing their duration. Non-time-based media items (such as web pages, images, documents, and so on) are represented in the queue by a standard size rectangular box (e.g., 3 minutes). In one embodiment, as shown in FIG. 8, when the queue is first accessed, the last entered related content item listing (806a) is displayed to the far right on the line within the current time slot (804a). The time slots (804) decrement sequentially to the left from the current time slot (804a) and any previously entered related items whose listing will fit in the line (802) after the end of the last entered item are shown with their durations represented by the length of the rectangular box (806) associated with the item. The items are listed in the reverse order in which they were added to the queue. Optionally, as shown in FIG. 8, space (806b) to the far left on the line (802) can be reserved to display a message, such as "Coming Up" (808), to explain to the user that this RC Guide shows a list of items that are in the user's queue. Alternately, the first entered related content item would be displayed to the far right on the line within the current time slot. In this embodiment, the items are listed in the order in which they were added to the queue.

The user can navigate among items in the queue by pressing the Next/Previous ("|<", ">|") buttons on the remote control to move forward/backwards in the queue. In this way, the user can view additional item listings that could not initially be viewed in the RC Guide. If the user scrolls into the items that could not initially be displayed, they would appear in the RC Guide, and items at the front end of the line would disappear.

When the RC Guide initially appears, the related content item listing in the current time slot is automatically selected. As the user navigates back and forth along the line, the item listed in the next box in the direction of scrolling becomes the selected item in turn. Further, in one embodiment when a queue navigation session is initiated, the related content item listed in the current time slot of the RC Guide is automatically displayed in the source media sector in lieu of the source video. As indicated previously, if the related content item is time-based such as a video or audio file, the file is played from the beginning, or in one version if the file had been played before, it can be started from the last viewed or heard location. In the case where the related content item is non-time dependent such as a web page, document or image, the item is simply displayed to the user. In this embodiment, as the user scrolls and new items are selected, they are automatically displayed in the source video sector in lieu of the previously displayed item. Alternately, the selected related content item is not automatically displayed. In this embodiment, the user presses a prescribed button on the remote control (e.g., "Enter") to cause the selected item to be displayed in the source video sector. To assist the user in identifying the selected item in the RC Guide, the item can be highlighted in any appropriated visually distinguishing manner.

4.0 Other Embodiments

While the foregoing description of the present concurrent presentation technique was described as providing information about content related to a source media presentation, where the related content is accessed via a network-connection, the technique can also be employed in the absence of a network connection as well. For example, the technique can be used in a fully self-contained system where related media items come from a personal library.

It is also noted that any or all of the aforementioned embodiments throughout the description may be used in any combination desired to form additional hybrid embodiments. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computer-implemented process for providing a source media presentation to a user along with a listing of available content items related to source media, comprising using a computer to perform the following process actions:
   receiving the source media presentation;
   identifying content items that are related to the source media;
   presenting the source media presentation to the user;
   automatically presenting a listing of the identified related content items to the user in a manner that in a passive presentation mode does not interrupt or obstruct the source media presentation, wherein the source media presentation and the listing of the identified related content items are displayed to the user in different portions of a screen of a display of said computer; and
   in response to navigation commands input from the user, allowing the user to navigate through the listing of the identified related content items.

2. The process of claim 1, wherein the action of automatically presenting a listing of the identified related content items to the user, comprises the actions of:
   displaying only one of the related content item listings on a portion of the screen of a display of said computer;
   determining if the currently displayed related content item listing has been displayed for more than a prescribed amount of time; and
   replacing the currently displayed related content item listing with another of the listings, whenever the currently displayed related content item listing has been displayed for more than the prescribed amount of time.

3. The process of claim 2, wherein the process action of replacing the currently displayed related content item listing with another of the listings, comprises an action of vertically scrolling the currently displayed related content item listing out of view while vertically scrolling said other listing into view.

4. The process of claim 1, wherein the source media presentation is of a type that has more than one part and these parts have different related content items associated with them, and wherein the process action of automatically presenting a listing of the identified related content items to the user, comprises the actions of:
   whenever one part of the source media presentation transitions to another, displaying one of the related content item listings associated with the new part of the presentation in lieu of a related content item listings associated with the previous part of the presentation;
   whenever the new part of the source media presentation has more than one related content item listing associated with it, determining if the displayed related content item listing associated with the new part of the presentation has been displayed for more than a prescribed amount of time; and
   whenever the displayed related content item listing has been displayed for more than the prescribed amount of time, replacing the displayed related content item listing with another of the listings associated with the new part of the presentation.

5. The process of claim 4, wherein the process action of replacing the displayed related content item listing with another of the listings associated with the new part of the presentation, comprises an action of horizontally scrolling the displayed related content item listing out of view while horizontally scrolling the listing associated with the new part of the presentation into view.

6. The process of claim 1, wherein the source media presentation comprises one of a web page, document, image, video, or audio-video combination, and wherein the process actions of presenting the source media presentation and a listing of the identified related content items to the user, comprises the actions of:
   displaying the source media presentation on an upper portion of the screen of a display of said computer;
   displaying the related content item listings on a portion of the screen below the source media presentation.

7. The process of claim 1, wherein the source media presentation comprises audio, and wherein the process actions of presenting the source media presentation and a listing of the identified related content items to the user, comprises the actions of:
   playing the source media presentation employing audio playback components of said computer; and
   displaying the related content item listings on a lower portion of the screen of a display of said computer.

8. The process of claim 1, wherein the related content items comprise one of a web page, document file, image file, separate audio or video file, and audio-video combinations (A/V).

9. The process of claim 1, wherein the related content items comprise advertisements for goods, services or events.

10. A computer-implemented process for providing a source media presentation to a user via a network-connected computing device along with an interactive listing of available content items related to source media, comprising using a computer to perform the following process actions:
- presenting the source media presentation to the user;
- identifying content items available via the network that are related to the source media;
- automatically presenting a listing of the identified related content items to the user during the presentation of the source media, wherein the source media presentation and the listing of the identified related content items are displayed to the user in different portions of a screen of a display of said computer; and
- in response to navigation commands input from the user, allowing the user to navigate through the related content item listings.

11. The process of claim 10, wherein the process action of allowing the user to navigate through the related content item listings, comprises an action of, in response to a scrolling command input from the user, scrolling the currently displayed related content item listing out of view while scrolling another one of the related content item listings into view.

12. The process of claim 11, wherein the source media presentation is of a type that has more than one part and these parts have different related content items associated with them, and wherein the process action of scrolling the currently displayed related content item listing out of view while scrolling another one of the related content item listings into view, comprises the actions of:
- whenever a scrolling command input from the user dictates scrolling from the related content item listings associated with one part of the source media presentation to the listings associated with another, displaying one of the related content item listings associated with the new part of the presentation in lieu of a related content item listings associated with the previous part of the presentation; and
- whenever a scrolling command input from the user dictates scrolling through the related content item listings associated with the same part of the source media presentation, repeatedly replacing the currently displayed related content item listing with another of the listings associated with the same part of the presentation until scrolling command ceases.

13. The process of claim 12, further comprising, whenever a scrolling command input from the user dictates scrolling from the related content item listings associated with one part of the source media presentation to the listings associated with another, the process actions of:
- noting and saving the position of the current part of the source media being presented; and
- presenting a prescribed representative position of the new part of the source media associated with the scrolled to related content item listings in lieu of the part of the source media associated with the scrolled from related content item listings.

14. The process of claim 13, further comprising a process action of presenting the noted and saved position of the part of the source media that was being presented when a scrolling command dictating scrolling from the related content item listings associated with one part of the source media presentation to the listings associated with another was originally received from the user, in response to a command input from the user dictating an end to the navigation of the related content item listings.

15. The process of claim 10, further comprising a process action of, in response to a queueing command input from the user, placing a user-selected one of the related content items listings in a queue.

16. The process of claim 15, further comprising the process actions of:
- in response to a command input from the user dictating that a queue navigation session be initiated, displaying the related content item listings that have been placed in the queue;
- in response to queue navigation commands input from the user, allowing the user to navigate through the listings in the queue and select any related content item listing therein; and
- whenever a related content item listing in the queue is selected,
- noting and saving the position of the current part of the source media being presented when the queue navigation session is initiated, and
- presenting the associated related content item in lieu of the source media.

17. The process of claim 16, further comprising a process action of presenting the noted and saved position of the source media being displayed when the queue navigation session was initiated in lieu of a related content item, in response to a command input from the user dictating an end to the navigation of the queue.

18. The process of claim 16, wherein the related content items comprise goods or services that can be purchased by placing a listings associated therewith in the queue and subsequently selecting the queued listing to link to a site where the user can complete the purchase.

19. A system for providing a video presentation to a user along with a listing of available content items related to the presentation, comprising:
- a network-connected television comprising a computing device;
- a television control device; and
- a graphical user interface computer program comprising program modules executable by the computing device, wherein the computing device is directed by the program modules to,
  - play the video presentation in a video presentation sector on the screen of the television;
  - identify content items available via the network associated with the television, which are related to the source media;
  - automatically display a listing of the identified related content items, one at a time, to the user in a related content sector on the television screen;
  - in response to related content item listings navigation commands input from the user via the television control device, allow the user to navigate through the related content item listings;
  - in response to a queuing command input from the user via the television control device,
    - place a user-selected one of the related content items listings in a queue, and
    - display the related content item listings that have been placed in the queue in the related content sector on the television screen; and
  - in response to queue navigation commands input from the user via the television control device, allow the user to navigate through the listings in the queue and to select any related content item listing therein, and whenever a related content item listing in the queue is selected, presenting the associated related content item in the video presentation sector on the television screen.

20. The system of claim 19, wherein the program module for displaying the related content item listings that have been placed in the queue in the related content sector on the television screen, comprises sub-modules for:

displaying a horizontal line of prescribed length time slots starting from the time the queuing command is input from the user; and displaying one of more boxes under the time slots, each of which represents a related content item listing and each of which is placed under the time slots in the order they were entered into the queue, wherein time-based related content items are represented by a box having a length along the line of time slots corresponding to their duration and wherein non-time-based related content items are represented by a box having a prescribed length along the line of time slots.

* * * * *